United States Patent
Sakakibara

[19]

[11] Patent Number: 6,147,626
[45] Date of Patent: Nov. 14, 2000

[54] DETERMINATION OF ZERO-ANGULAR-VELOCITY OUTPUT LEVEL FOR ANGULAR VELOCITY SENSOR

[75] Inventor: Toshikazu Sakakibara, Cupertino, Calif.

[73] Assignee: Visteon Technologies, LLC, Sunnyvale, Calif.

[21] Appl. No.: 09/132,695

[22] Filed: Aug. 11, 1998

[51] Int. Cl.[7] .................................................. G08G 1/123
[52] U.S. Cl. .......................... 340/988; 33/356; 73/1.77; 73/178 R; 73/503.3; 73/504.02; 701/200
[58] Field of Search .................................. 340/995, 988; 33/365, 318; 73/504.02, 503.3, 178 R, 1.01, 1.77, 504.12, 504.14; 701/200, 208, 213, 214

[56] References Cited

U.S. PATENT DOCUMENTS

| | | | |
|---|---|---|---|
| 4,409,836 | 10/1983 | Comroe et al. | 73/505 |
| 5,016,007 | 5/1991 | Iihoshi et al. | 340/995 |
| 5,122,960 | 6/1992 | Ooka | 33/356 |
| 5,270,959 | 12/1993 | Matsuzaki et al. | 364/571.04 |
| 5,278,424 | 1/1994 | Kagawa | 340/995 |
| 5,345,382 | 9/1994 | Kao | 33/356 |
| 5,367,463 | 11/1994 | Tsuji | 340/988 |
| 5,390,123 | 2/1995 | Ishikawa . | |
| 5,424,953 | 6/1995 | Masumoto et al. | 340/988 |
| 5,440,484 | 8/1995 | Kao | 33/356 |

FOREIGN PATENT DOCUMENTS

| | | |
|---|---|---|
| 0391647A2 | 10/1990 | European Pat. Off. . |
| 0763713A2 | 3/1997 | European Pat. Off. . |
| 2020037 | 11/1979 | United Kingdom . |

*Primary Examiner*—Brent A. Swarthout
*Attorney, Agent, or Firm*—Mark L. Mollon

[57] ABSTRACT

A technique for determining a gyro zero voltage is provided. A gyroscope ("gyro") is installed in an automobile as a component of an on-board navigation system. The gyro outputs a voltage representing an angular velocity of the vehicle. The gyro output voltage representing zero angular velocity ("gyro zero voltage") is determined by first determining when the vehicle is stationary based upon the amount of noise in the output voltage of the gyro. When the vehicle is determined to be stationary, the gyro zero voltage is measured.

26 Claims, 7 Drawing Sheets

DETERMINATION OF ZERO-ANGULAR-VELOCITY OUTPUT LEVEL FOR ANGULAR VELOCITY SENSOR

FIELD OF THE INVENTION

The present invention pertains to sensors used in vehicles. More particularly, the present invention relates to determination of a zero angular velocity output level in an angular velocity sensor.

BACKGROUND OF THE INVENTION

Angular velocity sensors, such as gyroscopes ("gyros"), are sometimes used in vehicles to measure changes in heading. One particular application of a gyro is to measure changes in heading in an on-board navigation system for an automobile, which is designed to assist the driver of the automobile in navigating. Such systems are available from Zexel Innovation, Inc., of Sunnyvale, Calif.

Calibration is a problem that is associated with gyros. In particular, a gyro normally outputs a voltage or other equivalent signal which represents the current angular velocity detected by the sensor. To determine the true angular velocity, the output voltage of the gyro is compared with the output voltage level that corresponds to an angular velocity of zero-the difference indicates the true angular velocity. Thus, the output voltage level that corresponds to an angular velocity of zero is essentially a reference level, which may be referred to as the "gyro zero voltage". Accurate determination of angular velocity, therefore, depends upon accurate knowledge of the gyro zero voltage. However, the output of the gyro has a tendency to drift in response to changes in temperature and humidity and other factors. Consequently, navigation systems which employ these sensors typically employ some technique to determine and update the gyro zero voltage.

One approach to determining the gyro zero voltage is to measure the output of the gyro each time the vehicle stops and to set the gyro zero voltage equal to the measured value. It may be difficult, however, to reliably determine when the vehicle is stationary. In an automobile navigation system such as mentioned above, one approach to determining when the vehicle is stationary is to observe the rotation of the vehicle's wheels. Wheel rotation may be detected, for example, from the pulses that are typically used to increment the vehicle's odometer (distance sensor). The vehicle may be considered to be stationary if no pulses are observed for a predetermined time interval. However, if the vehicle is moving very slowly, it is possible that no pulses will be observed during the time interval even though the vehicle is moving. Hence, the vehicle may actually have a non-zero angular velocity, such that the output of the angular velocity sensor may not accurately represent the gyro zero voltage.

Hence, what is needed is an improved technique for determining a gyro zero voltage. In particular, what is needed is an improved technique for determining when a vehicle in which a gyro is installed is stationary.

SUMMARY OF THE INVENTION

A method and apparatus are provided for determining when a vehicle which has a sensor is stationary. The amount of noise in an output of the sensor is measured, and a determination of when the vehicle is stationary is made based on the amount of noise.

Also provided are a method and apparatus for calibrating such a sensor. A determination of when the vehicle is stationary is made based on the amount of noise in the output of the sensor. The output level of the sensor is taken as a reference output level of the sensor when the vehicle is determined to be stationary.

Also provided is an angular velocity sensor. The sensor includes means for measuring the noise level in the output of the sensor, means for determining whether a predetermined relationship exists between the noise level and a predetermined level, and means for outputting an indication when the predetermined relationship exists.

Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A technique for determining the zero angular velocity output voltage of a gyro (the "gyro zero voltage") is described. In particular, the noise level in the gyro output voltage is used to determine whether a vehicle is stationary for purposes of determining the gyro zero voltage, as will be described in greater detail below.

A gyro may be used in a navigation system designed to assist the driver of an automobile in navigating. Specifically, the gyro may be used in such a system as an angular velocity sensor to detect changes in the heading of the automobile. An example of such a system is one which provides the driver with a visual display of a street map of a given geographic area, based on a stored map database, and indicates the position and movement of the vehicle as the vehicle travels. In response to the driver's specifying a destination, the system computes a best route from the vehicle's current position to the specified destination and then provides step-by-step instructions to the driver to guide the driver to the destination. The instructions may be given in the form of displayed text and/or recorded or synthesized speech. Such an automobile navigation system may use well-known techniques to estimate the position of the vehicle as the vehicle travels based on its previous positions. The estimated position of the vehicle is periodically adjusted based on the street map database to correct for any positioning error that may have accumulated. The navigation system may also include a high-accuracy positioning system, such as Global Positioning System (GPS) or the like, which may operate in conjunction with, or as a back-up system to, the primary positioning system. Navigation systems such as described above are available from Zexel Innovation, Inc., of Sunnyvale, Calif.

Figure 1:
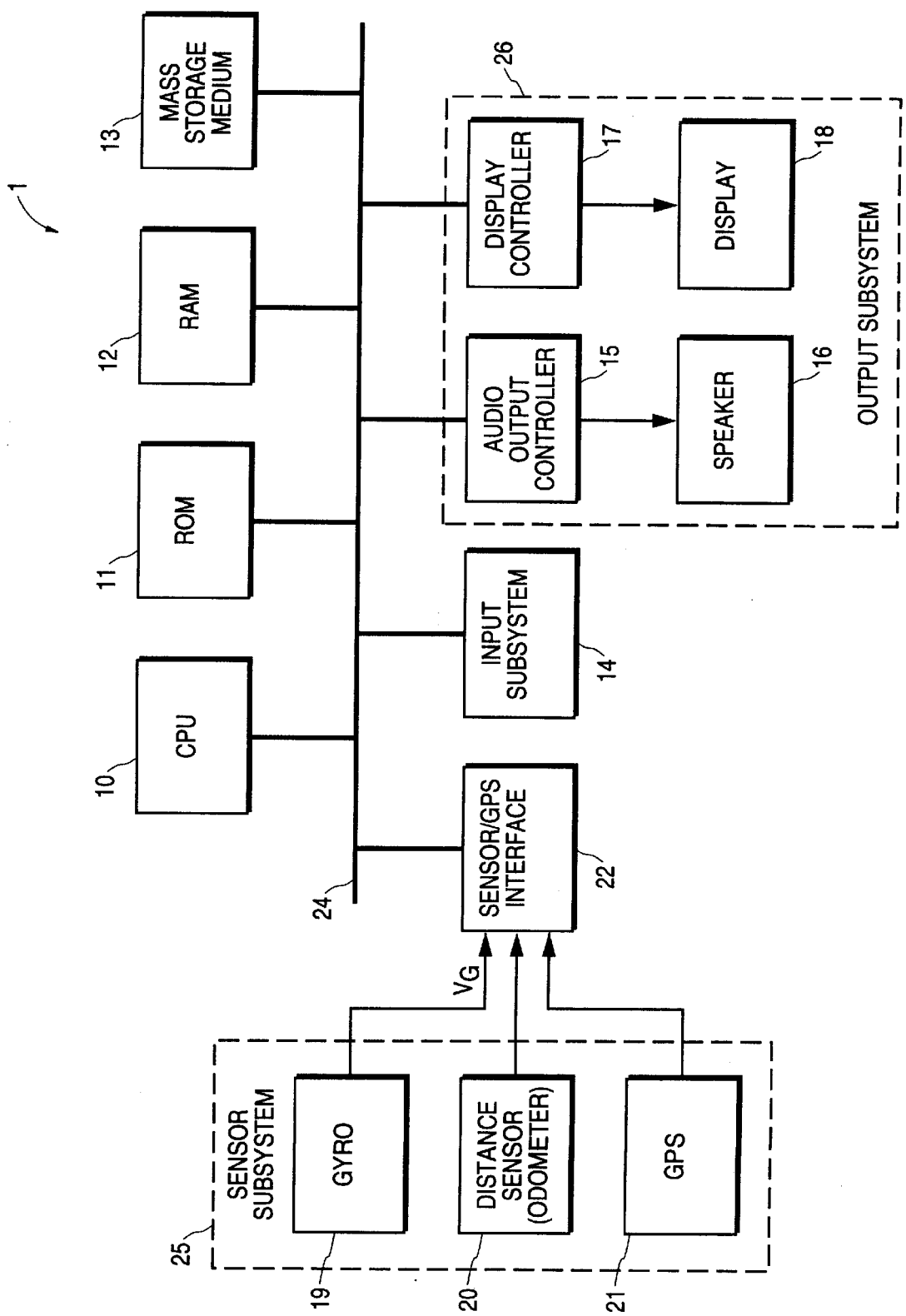
FIG. 1 is a block diagram of a navigation system for assisting the driver of an automobile in navigating.

FIG. 1 illustrates an example of a navigation system that can be installed in an automobile to assist the driver in navigating. The navigation system 1 includes a Central Processing Unit (CPU) 10, Read-Only Memory (ROM) 11, Random Access Memory (RAM) 12, and a mass storage device 13, coupled together by a bus system 24. The CPU 10 controls operation of the navigation system 1 by executing instructions stored in either ROM 11, RAM 12, mass storage device 13, or a combination of these devices. Mass storage medium 13 stores the map database containing streets and points it of interest for a given geographic area.

ROM 11 is non-volatile memory, a portion of which may be erasable and reprogrammable. For example, ROM 11 may include flash memory, electrically-erasable programmable ROM (EEPROM), or any other suitable form of programmable-erasable non-volatile memory. Mass storage device 13 may comprise a magnetic, optical, magneto-optical, or any other type of non-volatile storage device suitable for storing large quantities of data, such as the map database.

The navigation system 1 also includes several sensors 19, 20, and 21, which are installed in the vehicle to provide data for use in determining the position of the vehicle. In particular, the system 1 includes a gyro 19 for measuring angular velocity, a distance sensor (e.g., an odometer) 20, and a Global Positioning System (GPS) locator 21. Each of sensors 19–21 is coupled to an interface 22, which is coupled to the bus system 24. In particular, the gyro 19 provides an output voltage $V_G$ to the sensor interface 22, the level of which is indicative of the angular velocity of the vehicle. Bus system 24 may represent multiple individual buses, which may be interconnected by various bridges, controllers and/or adapters. Interface 22 contains various circuitry for interfacing sensors 19–21 to the bus 24, including analog-to-digital converters.

The system 1 also includes an input unit 14 coupled to the bus system 24. The input unit 14 includes various user-operable controls, such as buttons and/or switches, using which the driver can operate the system 1, such as to enter a destination, select a display mode, etc. The system 1 outputs digitized or synthesized audio navigation instructions to the user via an audio speaker 16. The audio speaker 16 is coupled to the bus system 24 via an audio output controller 15. Visual output, which may include a map display and/or navigation instructions, is provided to the driver by a display device 18 coupled to the bus system 24 via a display controller 17. The display device 18 may be a liquid crystal display (LCD), a cathode ray tube (CRT), or any other suitable form of display device.

Note that aspects of the techniques described herein may be embodied in software, as will be apparent from this description. That is, aspects of the techniques may be carried out in a computer system, such as navigation system 1, in response to its CPU executing sequences of instructions contained in memory. The instructions may be executed from RAM, ROM, a mass storage device, or a combination of such devices. Also, in various embodiments of the present invention, hardwired circuitry may be used in place of, or in combination with, software instructions to implement the described techniques. Thus, the techniques described herein are not limited to any specific combination of hardware circuitry and software, nor to any particular source for the instructions executed by a computer system.

Figure 2:
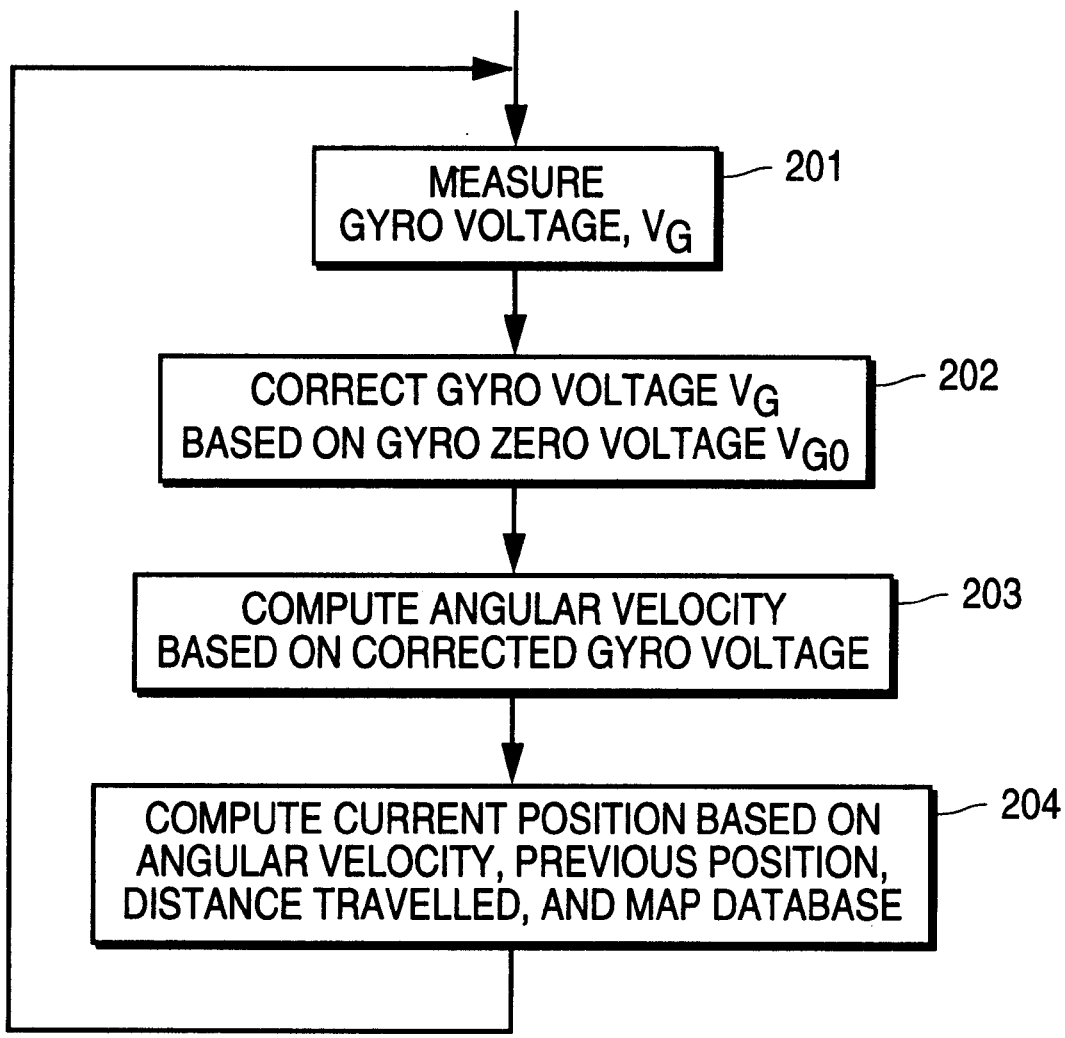
FIG. 2 is a flow diagram illustrating a routine, which may be implemented in the navigation system of FIG. 1, for determining the position of a vehicle.

FIG. 2 illustrates a routine, which may be implemented in the navigation system 1 to compute the current position of the vehicle, as part of the process of assisting the driver and navigating. At 201, the output voltage $V_G$ of the gyro 19 is measured. The gyro output voltage $V_G$ is then corrected based on the gyro zero voltage $V_{G0}$ at 202. A technique for determining the gyro zero voltage $V_{G0}$ is described below. At 203, the angular velocity of the vehicle is computed based upon the corrected gyro output voltage $V_G$. At 204, the current position of the vehicle is computed based upon the computed angular velocity, the previous position of the vehicle, the distance traveled since the previously computed position, and the map database, using wellk-nown techniques.

Figure 3:
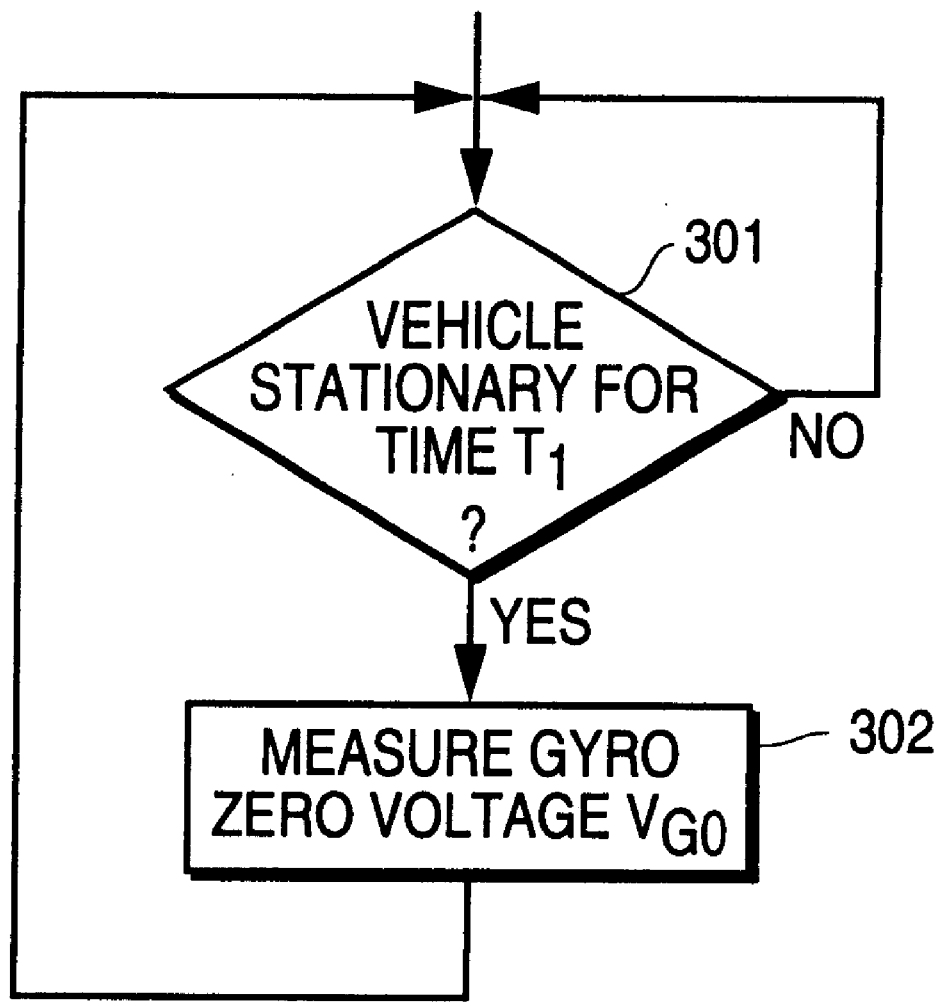
FIG. 3 is a flow diagram illustrating a routine, which may be implemented in the navigation system of FIG. 1, for measuring a gyro zero voltage.

FIG. 3 illustrates a routine for computing the gyro zero voltage $V_{G0}$, according to one embodiment. At 301, it is determined whether the vehicle has been stationary for a time interval of predetermined duration $T_1$. The value $T_1$ is application specific and can be determined empirically. If the vehicle has been stationary for a time $T_1$, then at 302, the gyro zero voltage $V_{G0}$ is measured using any appropriate technique. For example, the gyro zero voltage $V_{G0}$ may be taken as a single output of the gyro or as a function of multiple outputs (e.g., an average) when the vehicle is stationary.

The vehicle is determined to be stationary based upon the noise level in the output voltage $V_G$ of the gyro 19. The noise level in the output $V_G$ of the gyro 19 is affected by the amount of vibration experienced by the gyro 19. The gyro 19 tends to experience more vibration when the vehicle is moving than when the vehicle is stationary. Consequently, there is a high correlation between the amount of noise in the output $V_G$ of the gyro 19 and whether or not the vehicle is moving. Therefore, the vehicle is determined to be stationary when the magnitude of the noise level is less than a predetermined threshold value, i.e., when the noise level is within a predetermined envelope. This technique is explained further with reference to FIGS. 4A and 4B.

Figure 4A:
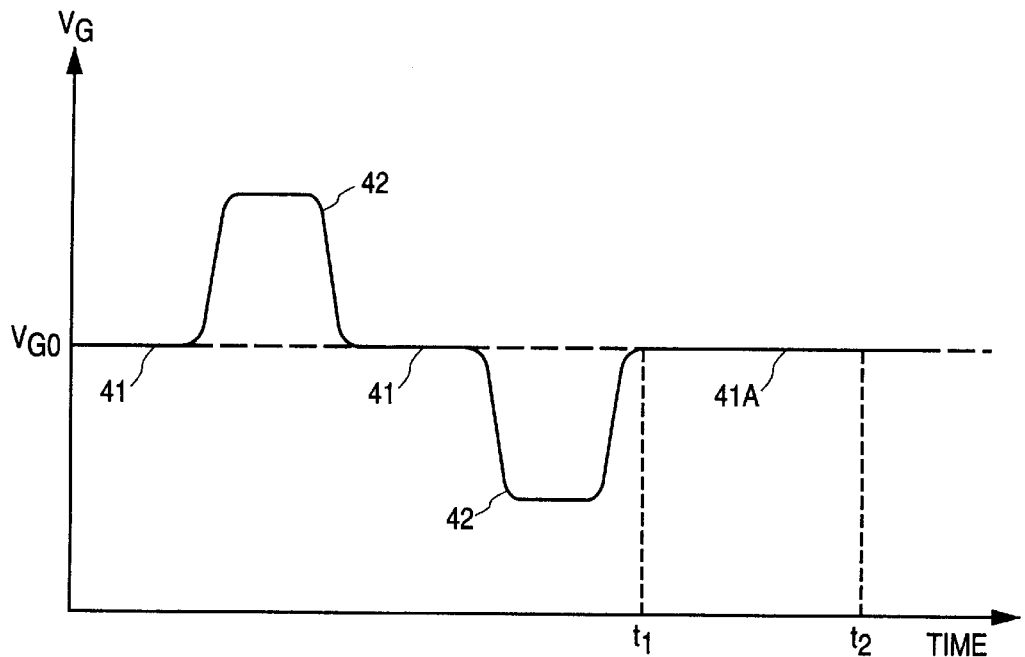
FIG. 4A is a signal diagram illustrating an example of an output of a gyro.

FIG. 4A illustrates an example of the output voltage $V_G$ of the gyro 19 as the vehicle travels. Specifically, segments 41 and 41A of the illustrated signal represent the output $V_G$ when the vehicle has no angular velocity. During such times, the vehicle may be either moving in a perfectly straight line or completely stationary. Segments 42 of the illustrated signal represent the output $V_G$ when the vehicle has angular velocity. Thus, segments 42 represent deviations from the gyro zero voltage value $V_{G0}$.

Figure 4B:
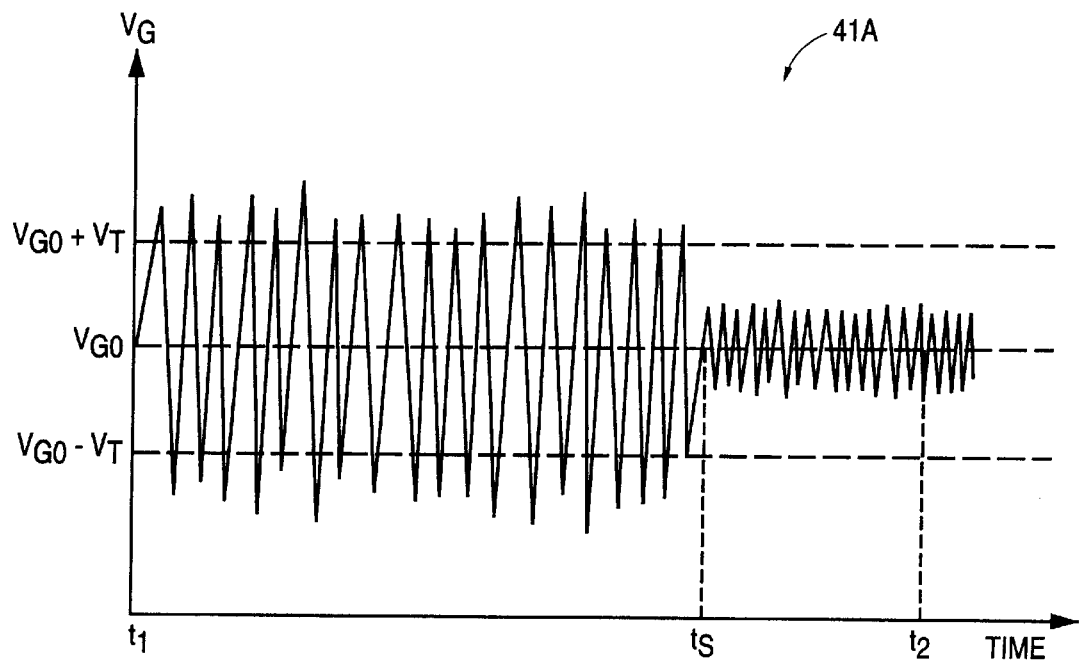
FIG. 4B is a signal diagram illustrating a portion of the signal illustrated in FIG. 4A.

FIG. 4B illustrates, at an expanded voltage scale, segment 41A of the curve of FIG. 4A, i.e., the segment of the waveform from time $t_1$ to time $t_2$. Assume that, from time $t_1$ to a time $t_S$ (prior to $t_2$), the vehicle is moving in a straight line. Assume further that the vehicle comes to a complete stop at time $t_S$ and continues to be stationary until at least time $t_2$. The noise level in the output $V_G$ of the gyro 19 is measurably greater when the vehicle is moving than when the vehicle is stationary. Thus, a threshold value $V_T$ can be identified, below which the noise level is likely to remain when the vehicle is stationary, and above which the noise level is likely to remain when the vehicle is moving. The threshold value $V_T$ is dependent upon the particular system configuration to be used and is therefore determined empirically. Thus, referring to FIG. 4B, the output $V_G$ of the gyro 19 generally exceeds the envelope defined by signal levels $(V_{G0}+V_T)$ and $(V_{G0}-V_T)$ during the time interval when the vehicle is moving, i.e., from time $t_1$, to time $t_S$. However, the output $V_G$ of the gyro 19 remains within this envelope when the vehicle is stationary, i.e., from time $t_S$ to time $t_2$. Thus, the determination of when the vehicle is stationary can be made by observing the noise level in the output $V_G$ of the gyro 19.

Figure 5:
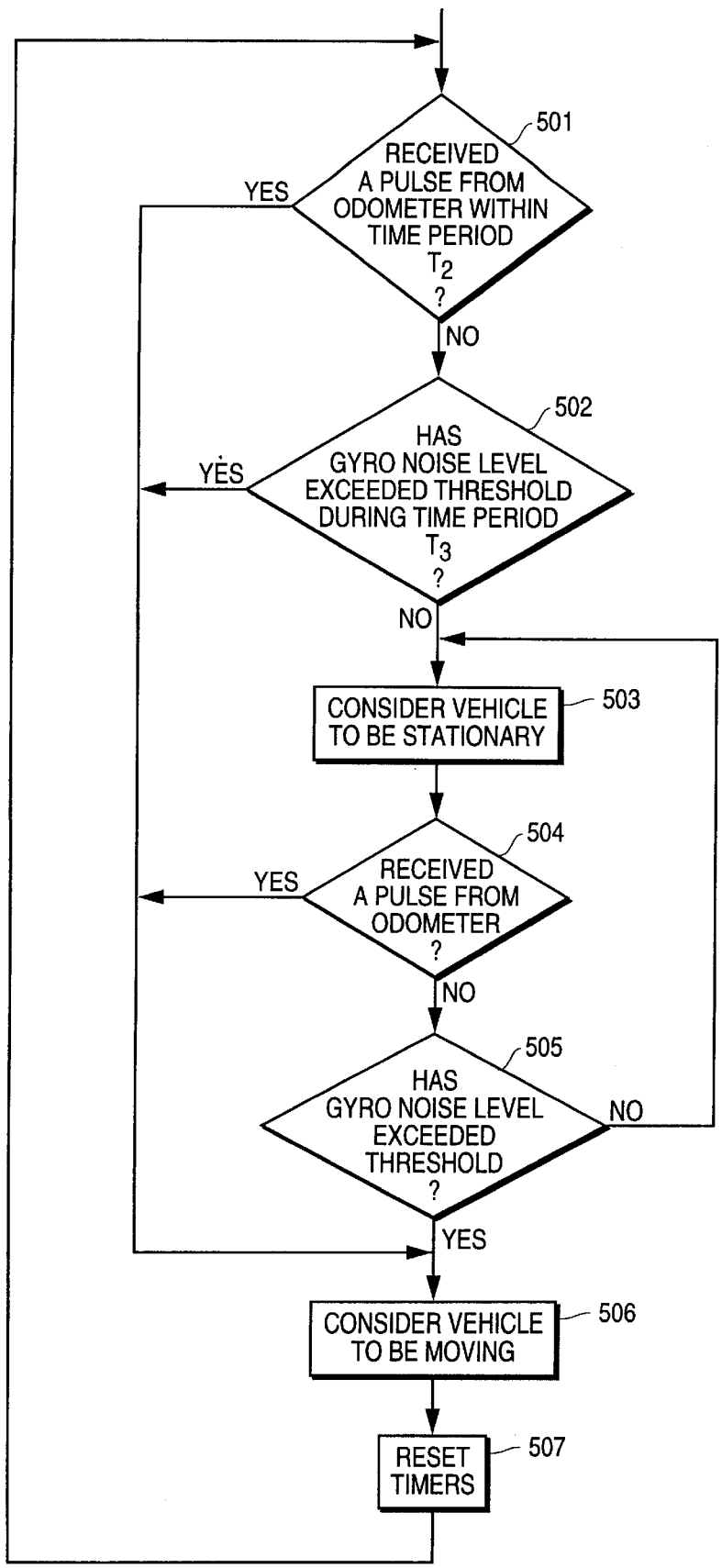
FIG. 5 is a flow diagram illustrating a routine, which may be implemented in the navigation system of FIG. 1, for determining when the vehicle is stationary.

FIG. 5 illustrates a routine for determining when the vehicle is stationary in accordance with the foregoing description. The distance sensor (odometer) 20 outputs pulses in response to rotation of the wheels of the vehicle, which are used in computing distance traveled. Accordingly, at (optional) 501, it is determined whether a pulse has been received from the distance sensor 20 within a time period of predetermined duration $T_2$. If desired, 501 may be omitted from the routine. If a pulse was received from the odometer within the time period $T_2$, then the routine proceeds from 506 by considering the vehicle to be moving. If no pulse has been received, or if 501 is omitted, then at 502 it is determined whether the magnitude of the gyro noise level has exceeded the envelope during time period of predetermined duration $T_3$. A technique for computing the gyro noise level is described below. If, at 502, the magnitude of the gyro noise level has not exceeded the predetermined envelope for a time $T_3$, then at 503 the vehicle is considered to be stationary. If, at 502, the magnitude of the gyro noise level has exceeded the predetermined envelope during time period $T_3$, then the routine proceeds from 506 by considering the vehicle to be moving. When the vehicle is considered to be moving at 506, then at 507 the timers associated with $T_2$ and $T_3$ are reset, and the routine repeats from 501 (or from 502 if 501 is omitted). Note that the time durations $T_2$ and $T_3$ are application specific and can be determined empirically.

Once the vehicle has been determined to be stationary at 503, the vehicle continues to be considered stationary until a pulse is received from the odometer at (optional) 504, or until the magnitude of the gyro noise level exceeds the threshold $V_T$ at 505. If the vehicle is determined to be stationary at 503, and a pulse is subsequently received from the odometer at (optional) 504 or the gyro noise level exceeds the threshold at 505, then the routine proceeds from 506 by considering the vehicle to be moving again.

If desired, 504 may be omitted from the routine. Thus, the determination of when the vehicle is stationary may be based entirely upon the gyro noise level (505), if desired. Considering the presence or absence of odometer pulses (501 and 504) is optional, although doing so may increase the likelihood of making the correct decision.

Figure 6:
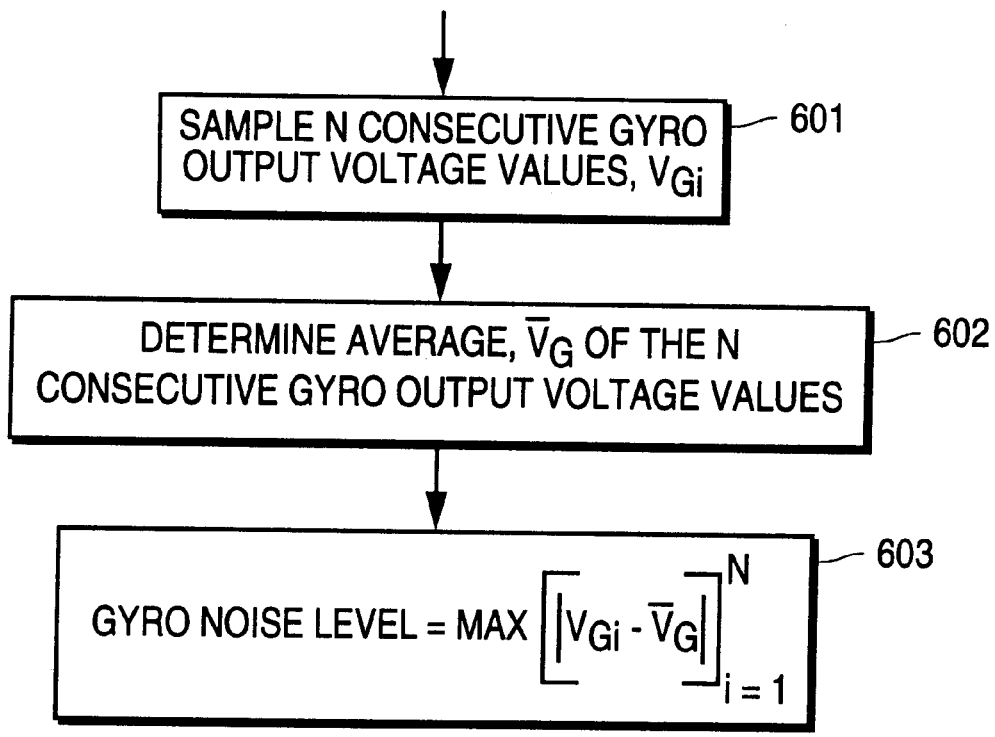
FIG. 6 is a flow diagram illustrating a routine, which may be implemented in the navigation system of FIG. 1, for determining the noise level in the gyro output.

FIG. 6 illustrates an exemplary routine for computing the gyro noise level, according to one embodiment. It should be noted that any suitable method may be used to determine the gyro noise level. At 601, N consecutive gyro output voltage values $V_{Gi}$ are obtained, where N is an integer that is large enough to provide a statistically meaningful number of samples. In one embodiment, N equals 10, and samples are obtained approximately every 1/20 of a second. At 602, the average $\overline{V}_G$ of the N consecutive gyro output values is determined. At 603, the gyro noise level is computed as the maximum difference from the average $\overline{V}_G$ of all of the samples $V_{Gi}$. As noted, other methods may be used to compute the gyro noise level. For example, the noise level determination may be computed as a function of the variance of samples of the gyro voltage $V_G$.

Hence, the foregoing technique provides a more reliable determination of when the vehicle is stationary than methods which rely solely upon the presence or absence of output pulses from the odometer. The technique is less susceptible to erroneously determining that the vehicle is stationary when the vehicle is actually moving. Consequently, the technique allows more accurate computations of the gyro zero voltage.

It will be recognized that the foregoing technique depends upon proper installation of the navigation system 1 in the vehicle, to reduce vibration that is not caused by travel of the vehicle. In particular, the navigation system 1 should be installed so that it is not loose, and is reasonably well insulated against engine vibration and other sources of vibration that are not related to travel of a vehicle. If the gyro 19 is loose or poorly insulated against such vibration, the gyro 19 may detect such vibration and output a noisy signal while the vehicle is stationary. With prior art gyros, it might be difficult or impossible for an installation technician to confirm whether the gyro is insulated against such vibration or is sufficiently secure. The following technique, however, may be used to assist such a technician in installing a gyro properly for use with the above described technique.

Figure 7:
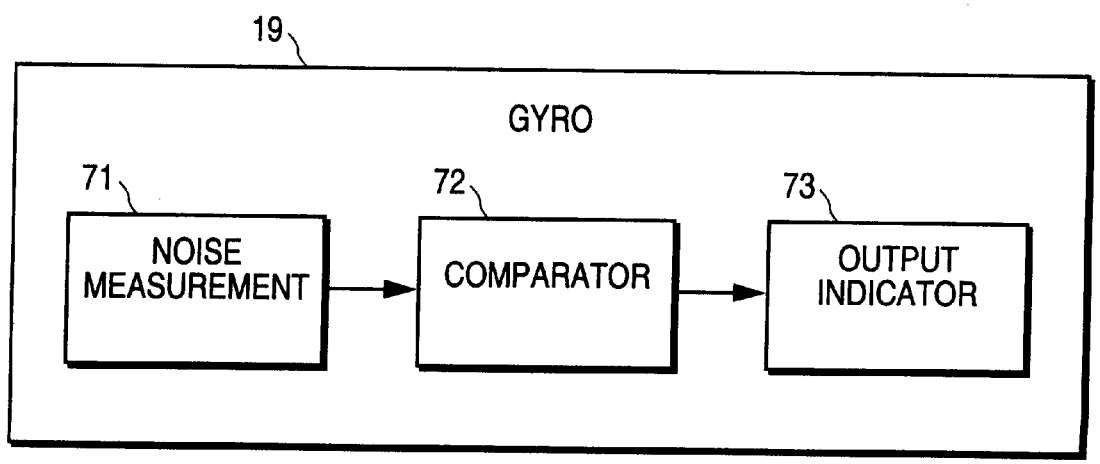
FIG. 7 is a block diagram of a gyro capable of providing an indication of when its output noise level is below a threshold level.

In particular, the gyro 19 is equipped with circuitry for determining the noise level in its output and for providing a separate output indication of the noise level. The installing technician can observe this separate output indication to determine when the gyro has been properly installed. The output indication may be in any suitable form, such as a small lamp, a graphical bar indicator, an audible tone, etc. FIG. 7 illustrates a block diagram of a gyro having such features.

Referring to FIG. 7, the gyro 19 includes a noise measurement unit 71, a comparator 72, and an output indicator 73. The noise measurement unit 71 determines the noise level in the output $V_G$ of the gyro 19 using any suitable technique, such as described above. The noise measurement unit 71 outputs the noise level to the comparator 72, which compares the noise level to the predetermined threshold $V_T$. The output of the comparator is provided to the output indicator 73. The output indicator may be a small lamp, as noted above, which may remain lit while the noise level exceeds the threshold, and which ceases to be lit when the noise level falls below the threshold. If desired, the output indicator 73, noise measurement module 71 and/or comparator 72 may be disabled once the gyro 19 has been properly installed.

In another embodiment, the separate output indication of the gyro noise level may be provided via the main navigation system, i.e., through the display device 18 or the speaker 16, rather than through an indicator on the gyro itself.

Thus, a technique for determining a gyro zero voltage has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative sense rather than a restrictive sense.

What is claimed is:

1. A method of determining when a vehicle is stationary, the vehicle having a sensor, the method comprising:

acquiring a plurality of samples of an output of the sensor;

computing an amount of noise in the output of the sensor as a measure of the amount of deviation of the output from a nominal value of the output, based on the plurality of samples; and determining when the vehicle is stationary based on the amount of noise.

2. A method according to claim 1, wherein the sensor comprises an angular velocity sensor.

3. A method according to claim 2, wherein the angular velocity sensor comprises a gyroscope.

4. A method according to claim 2, wherein determining whether the vehicle is stationary based on the amount of noise comprises determining when the vehicle is stationary based on whether the amount of noise is less than a predetermined threshold.

5. A method as recited in claim 1, wherein said computing comprises:

computing the average of the samples; and computing the amount of noise in the output of the sensor as the largest difference between the samples and the average.

6. A method of calibrating an angular velocity sensor in a vehicle, the method comprising:

acquiring a plurality of samples of an output of the sensor;

computing an amount of noise in the output of the sensor as a measure of the amount of deviation of the output from a nominal value of the output, based on the plurality of samples;

determining when the vehicle is stationary based on the amount of noise; and determining an output level of the angular velocity sensor to be a reference output level of the angular velocity sensor when the vehicle is determined to be stationary.

7. A method according to claim 6, wherein the reference output level corresponds to zero angular velocity of the vehicle.

8. A method according to claim 6, further comprising:

measuring a plurality of outputs of the angular velocity sensor; and using the reference output level to correct the plurality of outputs.

9. A method according to claim 6, wherein the angular velocity sensor comprises a gyroscope.

10. A method according to claim 6, wherein determining whether the vehicle is stationary based on the amount of noise comprises determining that the vehicle is stationary when the amount of noise is less than a predetermined threshold.

11. A method as recited in claim 6, wherein said computing comprises:

computing the average of the samples; and computing the amount of noise in the output of the sensor as the largest difference between the samples and the average.

12. A method of determining a reference output level of a gyroscope in a vehicle, the reference output level corresponding to zero angular velocity of the vehicle, the method comprising:

acquiring a plurality of samples of an output of the gyroscope;

computing the average of the samples;

computing the amount of noise in the output of the gyroscope as the largest difference between the samples and the average;

determining when the vehicle is stationary based on the amount of noise; and measuring the reference output level when the vehicle is determined to be stationary.

13. A method according to claim 12, wherein determining whether the vehicle is stationary based on the amount of noise comprises determining when the vehicle is stationary based on whether the amount of noise is less than a predetermined threshold.

14. An apparatus for determining when a vehicle is stationary, the vehicle having a sensor, the apparatus comprising:

means for acquiring a plurality of samples of an output of the sensor;

means for computing an amount of noise in the output of the sensor as a measure of the amount of deviation of the output from a nominal value of the output, based on the plurality of samples; and means for determining when the vehicle is stationary based on the amount of noise.

15. An apparatus according to claim 14, wherein the sensor comprises an angular velocity sensor.

16. An apparatus according to claim 15, wherein the angular velocity sensor comprises a gyroscope.

17. An apparatus according to claim 15, wherein the means for determining whether the vehicle is stationary based on the amount of noise comprises means for determining when the vehicle is stationary based on whether the amount of noise is less than a predetermined threshold.

18. An apparatus as recited in claim 14, wherein said means for computing comprises:

means for computing the average of the samples; and means for computing the amount of noise in the output of the sensor as the largest difference between the samples and the average.

19. An apparatus for calibrating an angular velocity sensor in a vehicle, the apparatus comprising:

means for acquiring a plurality of samples of an output of the sensor;

means for computing an amount of noise in the output of the sensor as a measure of the amount of deviation of the output from a nominal value of the output, based on the plurality of samples;

means for determining when the vehicle is stationary based on the amount of noise; and means for determining an output level of the angular velocity sensor to be a reference output level of the angular velocity sensor when the vehicle is determined to be stationary.

20. An apparatus according to claim 19, wherein the reference output level corresponds to zero angular velocity of the vehicle.

21. An apparatus according to claim 19, further comprising:

means for measuring a plurality of outputs of the angular velocity sensor; and means for using the reference output level to correct the plurality of outputs.

22. An apparatus according to claim 19, wherein the angular velocity sensor comprises a gyroscope.

23. An apparatus according to claim 19, wherein the means for determining whether the vehicle is stationary based on the amount of noise comprises means for determining that the vehicle is stationary when the amount of noise is less than a predetermined threshold.

24. An apparatus as recited in claim 19, wherein said means for computing comprises:

means for computing the average of the samples; and means for computing the amount of noise in the output of the sensor as the largest difference between the samples and the average.

25. An apparatus for determining a reference output level of a gyroscope in a vehicle, the reference output level corresponding to zero angular velocity of the vehicle, the apparatus comprising:

means for acquiring a plurality of samples of an output of the gyroscope;

means for computing the average of the samples;

means for computing the amount of noise in the output of the gyroscope as the largest difference between the samples and the average;

means for determining when the vehicle is stationary based on the amount of noise; and means for measuring the reference output level when the vehicle is determined to be stationary.

26. An apparatus according to claim 25, wherein the means for determining whether the vehicle is stationary based on the amount of noise comprises means for determining when the vehicle is stationary based on whether the amount of noise is less than a predetermined threshold.

* * * * *